(12) United States Patent
Duran Gonzalez

(10) Patent No.: US 9,760,356 B2
(45) Date of Patent: Sep. 12, 2017

(54) LOOP NEST PARALLELIZATION WITHOUT LOOP LINEARIZATION

(71) Applicant: Intel Corporation, Santa Clara, CA (US)

(72) Inventor: Alejandro Duran Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 14/493,640

(22) Filed: Sep. 23, 2014

(65) Prior Publication Data

US 2016/0085530 A1    Mar. 24, 2016

(51) Int. Cl.
G06F 9/44    (2006.01)
G06F 9/45    (2006.01)

(52) U.S. Cl.
CPC .................... G06F 8/452 (2013.01)

(58) Field of Classification Search
CPC ........ G06F 8/452; G06F 8/4452; G06F 8/433; G06F 8/456
See application file for complete search history.

(56) References Cited

U.S. PATENT DOCUMENTS

| | | | | |
|---|---|---|---|---|
| 5,958,048 A * | 9/1999 | Babaian | .................. | G06F 8/441 712/241 |
| 6,148,439 A * | 11/2000 | Nishiyama | ............ | G06F 8/4442 711/213 |
| 6,820,250 B2 * | 11/2004 | Muthukumar | ........ | G06F 8/4452 717/116 |
| 7,975,134 B2 * | 7/2011 | Gonion | .................... | G06F 8/441 712/13 |
| 2004/0003386 A1 * | 1/2004 | Tal | .......................... | G06F 8/443 717/160 |
| 2005/0097509 A1 * | 5/2005 | Rong | .................... | G06F 8/4452 717/106 |
| 2005/0268039 A1 * | 12/2005 | Archambault | ...... | G06F 9/30047 711/119 |
| 2006/0248520 A1 * | 11/2006 | Kawabata | ............... | G06F 8/443 717/160 |
| 2007/0169056 A1 * | 7/2007 | Plum | ..................... | G06F 8/4442 717/160 |
| 2009/0158247 A1 * | 6/2009 | Tal | ......................... | G06F 8/4452 717/106 |
| 2010/0306733 A1 * | 12/2010 | Bordelon | ................ | G06F 8/433 717/106 |
| 2015/0220314 A1 * | 8/2015 | Divekar | .................. | G06F 8/445 717/157 |
| 2016/0110171 A1 * | 4/2016 | Bikshandi | ............. | G06F 7/4806 717/160 |

\* cited by examiner

*Primary Examiner* — Duy Khuong Nguyen
(74) *Attorney, Agent, or Firm* — Jordan IP Law, LLC

(57) ABSTRACT

Systems and methods may provide for identifying a nested loop iteration space in user code, wherein the nested loop iteration space includes a plurality of outer loop iterations, and distributing iterations from the nested loop iteration space across a plurality of threads, wherein each thread is assigned a group of outer loop iterations. Additionally, a compiler output may be automatically generated, wherein the compiler output contains serial code corresponding to each group of outer loop iterations and de-linearization code to be executed outside the plurality of outer loop iterations. In one example, the de-linearization code includes index recovery code that is positioned before one or more instances of the serial code in the compiler output.

18 Claims, 5 Drawing Sheets

LOOP NEST PARALLELIZATION WITHOUT LOOP LINEARIZATION

TECHNICAL FIELD

Embodiments generally relate to compilers. More particularly, embodiments relate to compilers that enable enhanced performance with respect to nested loop iteration spaces.

BACKGROUND

Compilers may be used to transform human readable source code into executable object code in a variety of settings. Source code may include nested loops that involve performing iterative operations (e.g., "iterations") within other iterative operations (e.g., "loop nests"). Conventional compilers may linearize (e.g., "flatten") loop nests in order to facilitate parallel processing of the resulting object code by multiple threads of a computing system. When encountering loop nests, however, conventional compilers create an extra process that runs within each loop and facilitates the recovery of the pre-linearization indices of the loop. The extra process may involve performing division and modulus operations that increase the overhead of parallelization and in turn reduce overall performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
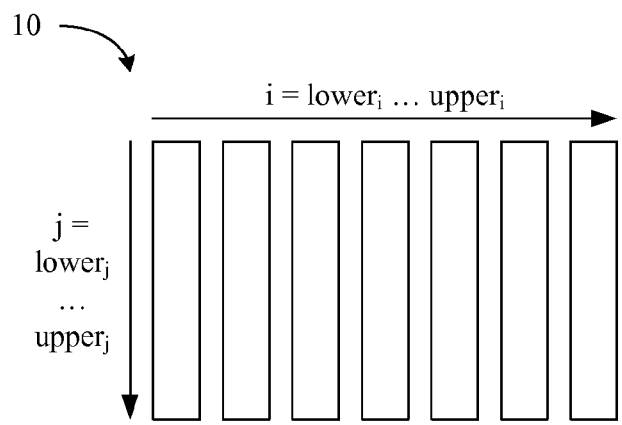
FIG. 1 an illustration of an example of a nested loop iteration space according to an embodiment.

Turning now to FIG. 1, a nested loop iteration space 10 is shown, wherein the nested loop iteration space 10 may be part of user code (e.g., source code written in a human readable format) submitted to a compiler (not shown) for transformation into, for example, executable object, machine and/or assembly code. In the illustrated example, a plurality of outer loop iterations of the nested loop iteration space 10 span the "i" dimension from "$lower_i$" to "$upper_i$," and each outer loop iteration includes an inner loop iteration spanning the "j" dimension from "$lower_j$" to "$upper_j$". Thus, the illustrated i and j loops are nested in the sense that that the iterations of the j loop are repeated within each iteration of the i loop. In the illustrated example, there are seven outer loop iterations, although the number of iterations may differ depending on the circumstances. As will be discussed in greater detail, the compiler may be configured to transform the nested loop iteration space 10 into an output that enables parallel execution of the underlying operations of the nested loop iteration space 10 without incurring additional overhead associated with index recovery. As a result, overall performance may be substantially improved.

Figure 2:
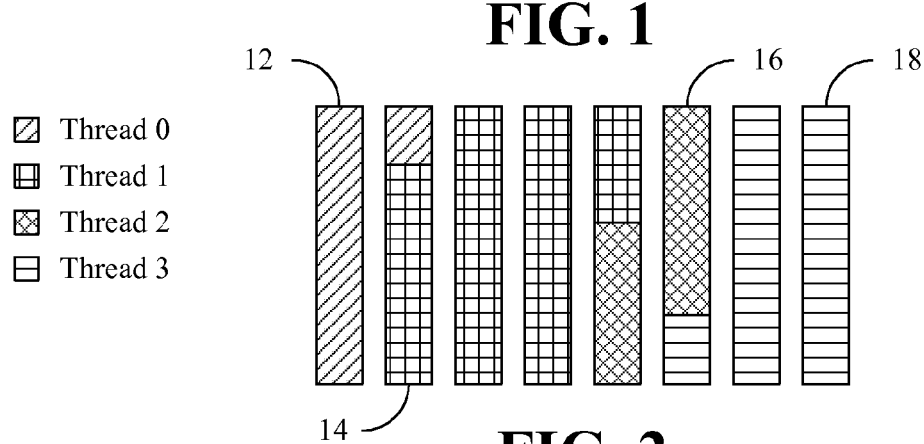
FIG. 2 is an illustration of an example of a distribution of a plurality of outer loop iterations across a plurality of threads according to an embodiment.

FIG. 2 shows an example in which a nested loop iteration space is distributed across a plurality of threads (e.g., "Thread 0" to "Thread 3"). In the illustrated example, a first group 12 of outer loop iterations is assigned to Thread 0, a second group 14 of outer loop iterations is assigned to Thread 1, a third group 16 of outer loop iterations is assigned to Thread 2, and a fourth group 18 of outer loop iterations is assigned to Thread 3. Of particular note is that threads may be assigned a number of contiguous iterations where some of the outer loop iterations will not be split between multiple threads. For example, the second group 14 of outer loop iterations includes two outer loop iterations that are not split between multiple threads. Another observation is that if a particular outer loop iteration is split between multiple threads, that iteration may be either the initial iteration or the final iteration in the group. For example, the initial outer loop iteration of the second group 14 is split between Thread 0 and Thread 1, and the final outer loop iteration of the second group 14 is split between Thread 1 and Thread 2. These two observations may be leveraged to obtain a more efficient parallelization scheme for the illustrated nested loop iteration space.

Figure 3:
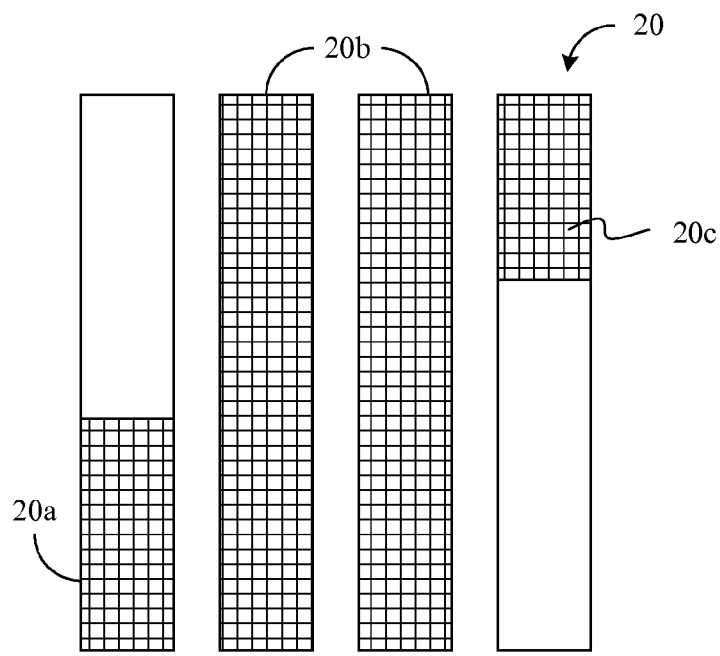
FIG. 3 is an illustration of an example of split iterations for a given thread according to an embodiment.

More particularly, FIG. 3 shows a group 20 (20a-20c) of outer loop iterations that may be assigned to a thread in a computing system. In the illustrated example, the group 20 includes a prologue portion 20a, complete portions 20b and an epilogue portion 20c. A loop transformation technique may be used in which a linearized index is reconstructed outside of the "logical" linearized iteration space and only before executing the iterations assigned in the loop. Indices in the original iteration space may then be followed with standard increments/decrements of the original code. Prologue code and epilogue code may be added around (but not within) the original loop code, wherein the traversal of the code may be adjusted to deal with the prologue portion 20a and the epilogue portion 20c (e.g., initial and final outer loop iterations, respectively, that are split between threads).

Figure 4:
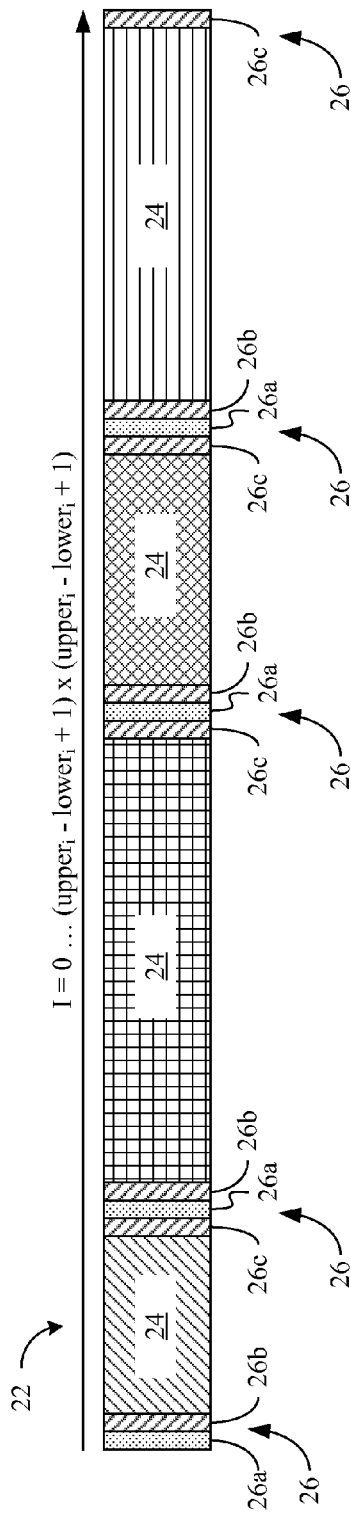
FIG. 4 is an illustration of an example of a compiler output according to an embodiment.

For example, FIG. 4 shows a compiler output 22 in which a nested loop iteration space such as, for example, the nested loop iteration space 10 (FIG. 1), is transformed into a more efficient version of executable object, machine and/or assembly code. In the illustrated example, the compiler output 22 includes serial code 24 that corresponds to each group of outer loop iterations. In one example, the serial code 24 may perform the complete portions such as, for example, the complete portions 20b (FIG. 3) of the outer loop iterations, without linearization/flattening of those portions. The illustrated compiler output 22 also includes de-linearization code 26 (26a-26c) that is to be executed outside the plurality of outer loop iterations. More particularly, the de-linearization code 26 may include index recovery code 26a positioned before (e.g., in execution order) the instances of the serial code 24, wherein the index recovery code 26a may enable recovery of the indices involved in the prologue and epilogue portions of the outer loop iterations in question.

Additionally, the de-linearization code 26 may include prologue code 26b that is dedicated to the initial iterations such as, for example, the prologue portion 20a (FIG. 3) of the outer loop iterations. Similarly, the de-linearization code 26 may include epilogue code 26c that is dedicated to the final iterations such as, for example, the epilogue portion 20c (FIG. 3) of the iterations. The illustrated approach therefore enables the major portion of the iterations in a nested loop iteration space to be conducted in parallel and without linearization or flattening. Such an approach may be particularly useful in situations having a relatively high number of iterations and/or a relatively low number of available threads (e.g., situations when the contiguous iterations substantially outnumber the split iterations).

Figure 5:
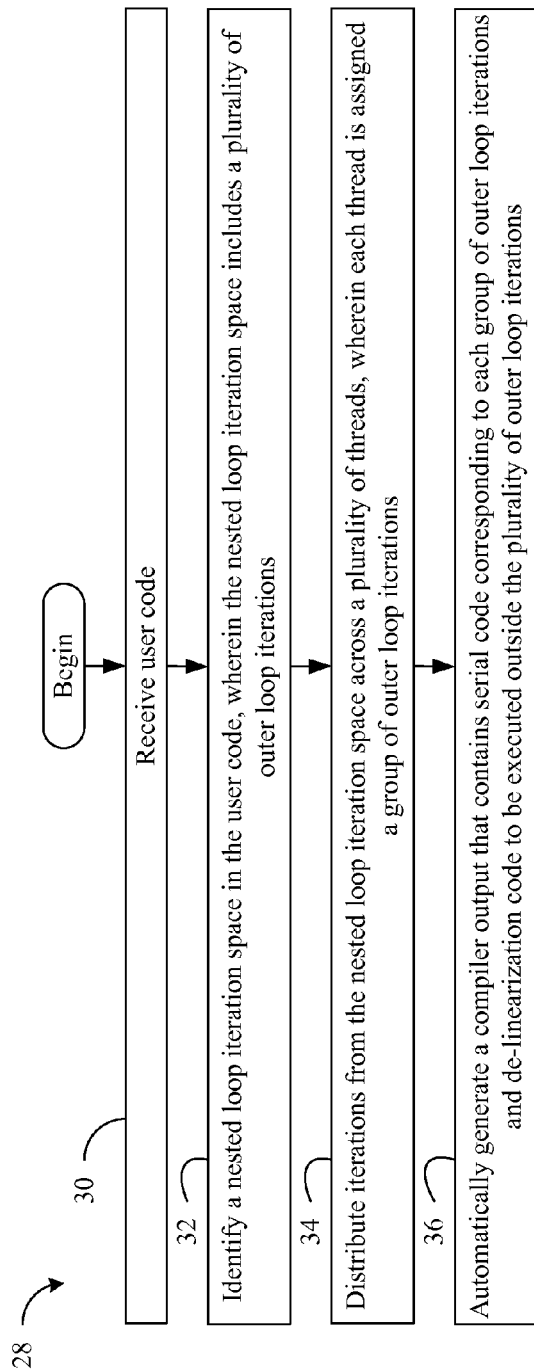
FIG. 5 is a flowchart of an example of a method of compiling user code according to an embodiment.

Turning now to FIG. 5, a method 28 of compiling user code is shown. The method 28 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 28 may be written in any combination of one or more programming languages, including an object oriented programming language such as C#, Dalvik, ART, .NET, Ruby, Pearl, Python, JAVA or the like.

Illustrated processing block 30 provides for receiving user code such as, for example, source code written in a high level programming language. Block 30 may involve using, for example, a keyboard, microphone, network controller or other design interface of a computing system to obtain the user code. A nested loop iteration space may be identified in the user code at block 32, wherein the nested loop iteration space includes a plurality of outer loop iterations. Illustrated block 34 distributes iterations from the nested loop iteration space across a plurality of threads, wherein each thread is assigned a group of outer loop iterations. Block 34 may involve delineating thread boundaries without actually identifying specific threads or other runtime resources. A compiler output (e.g., object, machine and/or assembly code) may be automatically generated at block 36, wherein the compiler output may contain serial code corresponding to each group of outer loop iterations and de-linearization code to be executed outside the plurality of outer loop iterations. Thus, block 36 may generally involve handling loop nests in a manner that enables enhanced performance.

Figure 6:
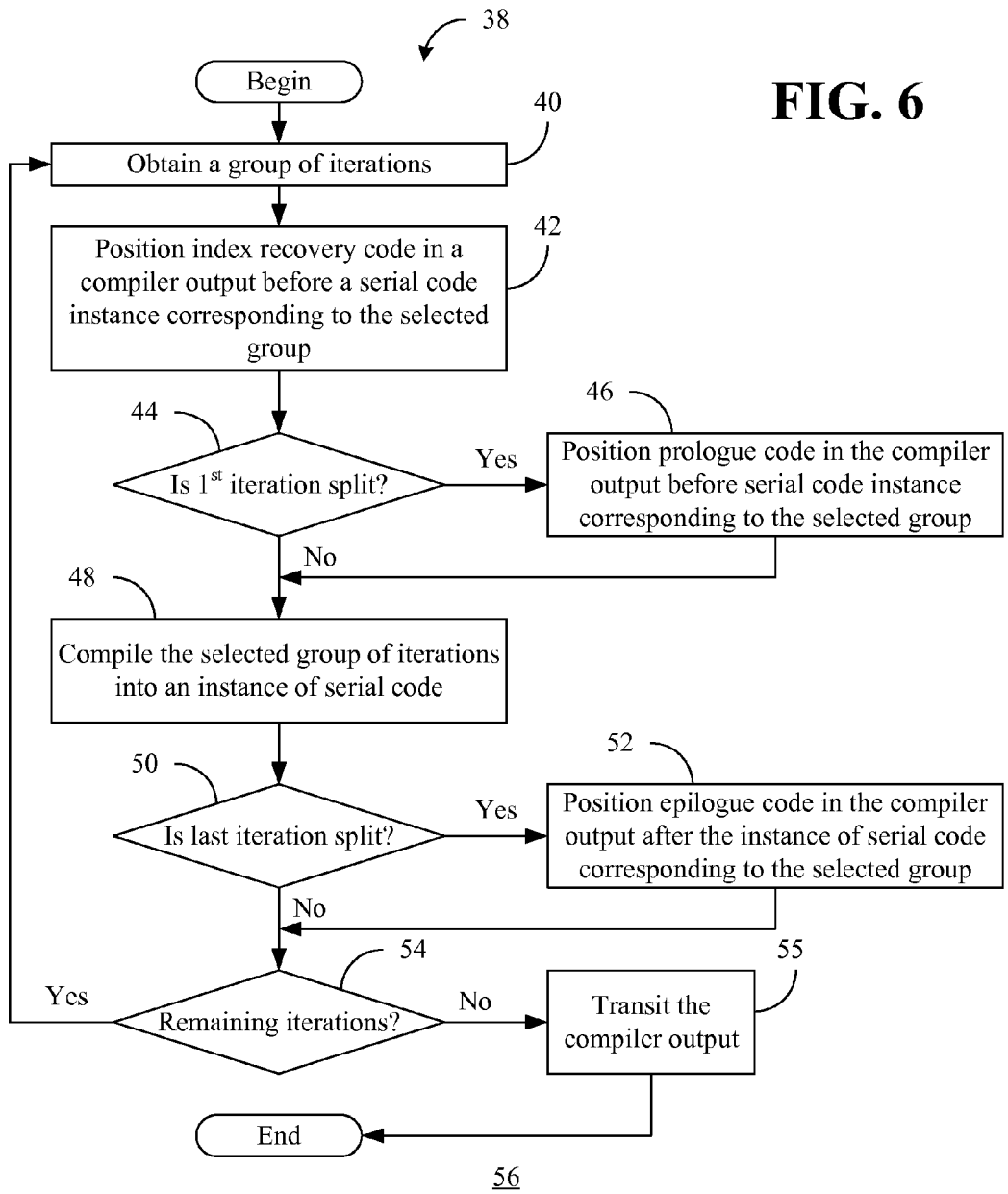
FIG. 6 is a flowchart of an example of a method of handling loop nests according to an embodiment.

FIG. 6 shows a method 38 of handling loop nests in a compiler. The method 38, which may be readily substituted for block 36 (FIG. 5), already discussed, may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 40 provides for obtaining/selecting a group of outer loop iterations in a nested loop iteration space. Block 42 may position index recovery code in a compiler output before (e.g., in execution order) an instance of serial code corresponding to the selected group of outer loop iterations, wherein the index recovery code may enable the recovery of the original indices of the selected group of outer loop iterations. A determination may be made at block 44 as to whether the initial (e.g., the first) iteration of the selected group is split across multiple threads. If so, illustrated block 46 positions special prologue code before (e.g., in execution order) the instance of serial code corresponding to the selected group of outer loop iterations. The prologue code may be dedicated to the initial iteration of the selected group. If a split of the initial iteration across multiple threads is not detected, block 46 is bypassed, in the illustrated example.

Block 48 may compile/transform the selected group of iterations (e.g., the non-split, complete portions) into an instance of serial code. The serial code may therefore represent a non-linearized version of the original loops corresponding to the non-split iterations in the selected group. Additionally, a determination may be made at block 50 as to whether the final (e.g., the last) iteration of the selected group is split across multiple threads. If so, illustrated block 52 positions special epilogue code after (e.g., in execution order) the instance of serial code corresponding to the selected group of outer loop iterations. The epilogue code may be dedicated to the final iteration of the selected group. If a split of the final iteration across multiple threads is not detected, block 52 is bypassed, in the illustrated example. In addition, a determination may be made at block 54 as to whether there are any remaining iterations. If so, the illustrated method 38 repeats. Moreover, the illustrated method 38 may be extended to multiple depths of loop nests by applying it recursively. If there are no remaining iterations, the compiler output may be transmitted at block 55 to another stage of the compiler (e.g., for handling of non-loop nest portions of the user code), a display, a speaker, network controller and/or other suitable report interface.

Figure 7:
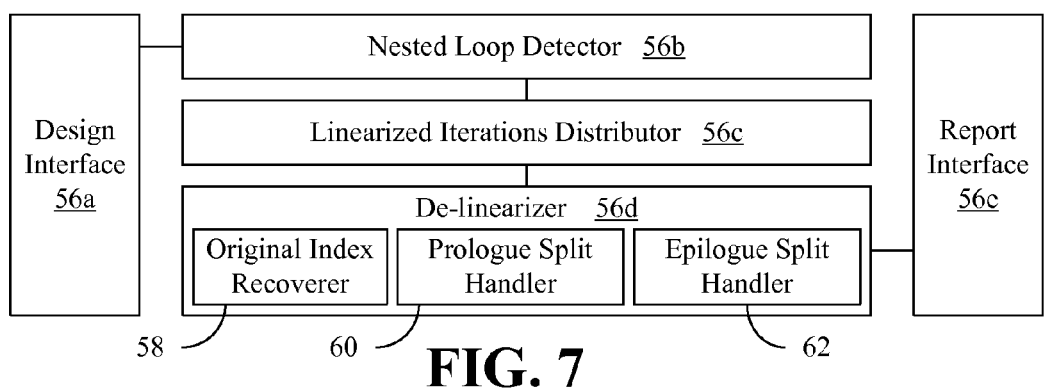
FIG. 7 is a block diagram of an example of a logic architecture according to an embodiment.

Turning now to FIG. 7, a logic architecture 56 (56a-56e) is shown. The architecture 56 may generally be used as a compiler or other suitable code utility to transform user code into, for example, executable object code. More particularly, the architecture 56 may implement (e.g., as logic instructions, configurable logic, fixed-functionality hardware logic, etc., or any combination thereof) one or more aspects of the method 28 (FIG. 5) and/or the method 38 (FIG. 6), already discussed. In the illustrated example, a design interface 56a (e.g., keyboard, microphone, network controller) is configured to receive user code, wherein a nested loop detector 56b coupled to the design interface 56a may identify a nested loop iteration space in the user code. The architecture 56 may also include a linearized iterations distributor 56c coupled to the nested loop detector 56b. The linearized iterations distributor 56c may distribute iterations from the nested loop iteration space across a plurality of threads, wherein each thread is to be assigned a group of outer loop iterations. As already noted, the iteration distribution may involve delineating thread boundaries without actually identifying specific threads or other runtime resources.

The illustrated architecture 56 also includes a de-linearizer 56d coupled to the linearized iterations distributor 56c, wherein the de-linearizer 56d automatically generates a compiler output that contains serial code corresponding to each group of outer loop iterations and de-linearization code to be executed outside the plurality of outer loop iterations. In one example, the de-linearization code includes index recovery code. In such a case, the de-linearizer 56d may include an original index recoverer 58 to position the index recovery code before (e.g., in execution order) one or more instances of the serial code in the compiler output. Additionally, the de-linearization code may include prologue code dedicated to an initial iteration in one or more of the groups of outer iterations. Thus, the de-linearizer 56d may also include a prologue split handler 60 to detect a split of the initial iteration(s) across multiple threads. The de-linearization code may also include epilogue code dedicated to a final iteration in one or more of the groups of outer iterations. Accordingly, the de-linearizer 56d may also include an epilogue split handler 62 to detect a split of the final iteration(s) across multiple threads. The illustrated architecture 56 also includes a report interface 56e coupled to the de-linearizer 56d, wherein the report interface 56e may transmit the compiler output to another stage of the compiler, a display, speaker, network controller, and so forth.

Figure 8:
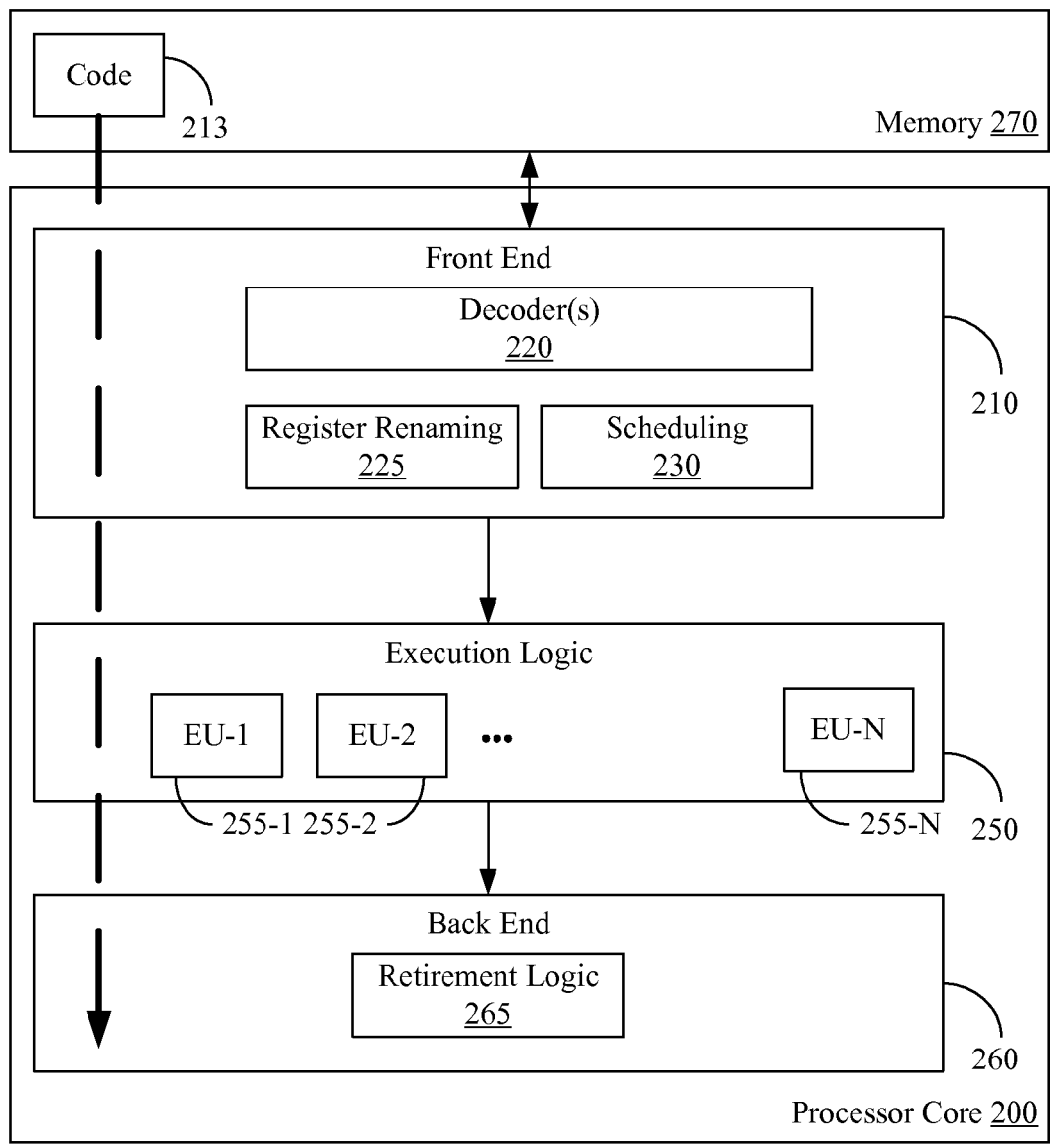
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 28 (FIG. 5) and/or the method 38 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
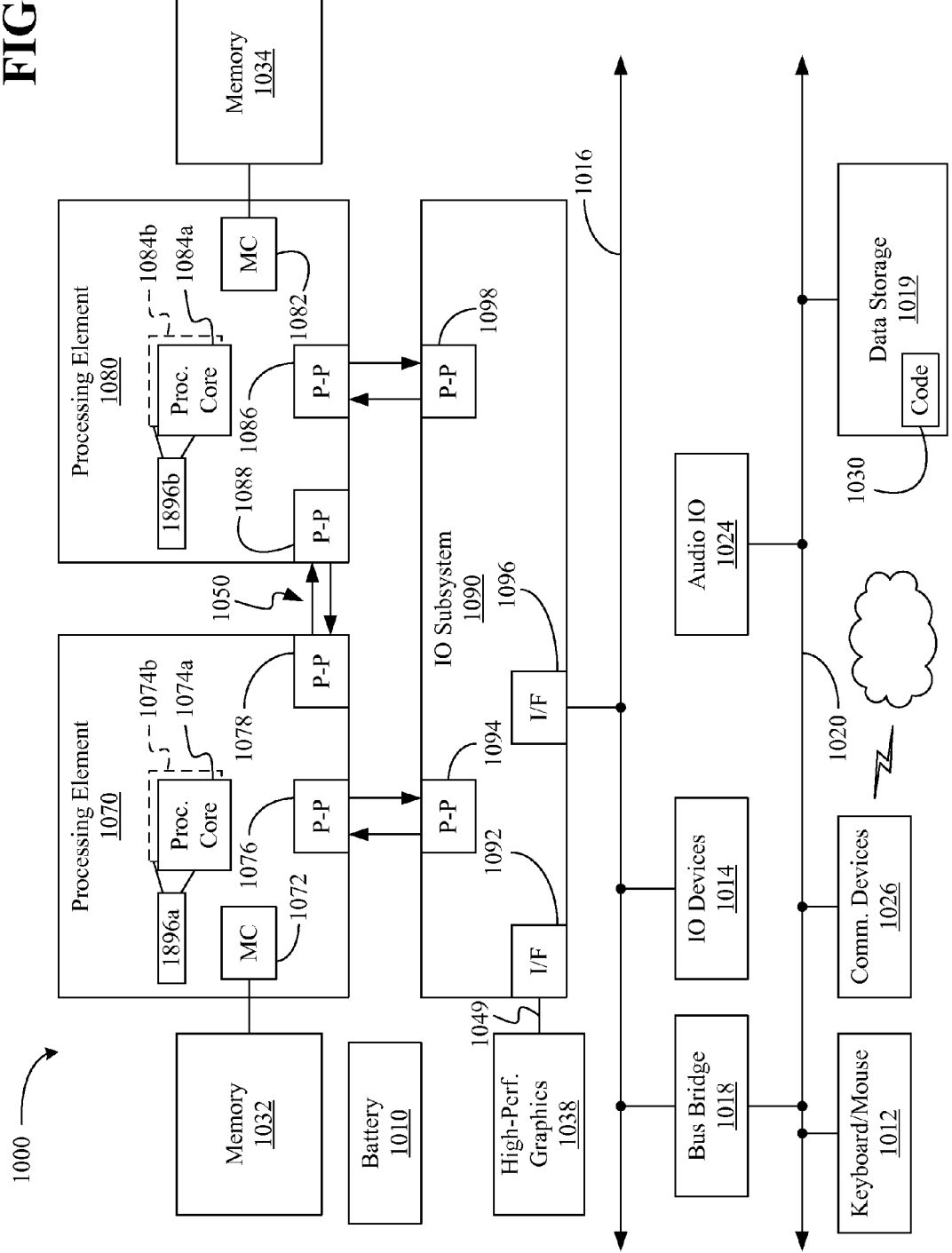
FIG. 9 is a block diagram of an example of a system according to an embodiment.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 28 (FIG. 5) and/or the method 38 (FIG. 6), already discussed, and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a code utility system comprising a design interface to receive user code and a compiler coupled to the design interface, the compiler including a nested loop detector to identify a nested loop iteration space in the user code, wherein the nested loop iteration space includes a plurality of outer loop iterations, a linearized iterations distributor to distribute iterations from the nested loop iteration space across a plurality of threads, wherein each thread is to be assigned a group of outer loop iterations, a de-linearizer to automatically generate a compiler output that contains serial code corresponding to each group of outer loop iterations and de-linearization code to be executed outside the plurality of outer loop iterations, wherein the de-linearization code is to include index recovery code, prologue code dedicated to an initial iteration in one or more of the groups of outer iterations, and epilogue code dedicated to a final iteration in one or more of the groups of outer iterations. The code utility system may also comprise a report interface coupled to the compiler, the report interface to transmit the compiler output.

Example 2 may include the system of Example 1, wherein the de-linearizer includes an original index recoverer to position the index recovery code before one or more instances of the serial code in the compiler output.

Example 3 may include the system of any one of Examples 1 or 2, wherein the de-linearizer includes a prologue split handler to detect a split of the initial iteration across multiple threads.

Example 4 may include the system of any one of Examples 1 or 2, wherein the de-linearizer includes an epilogue split handler to detect a split of the final iteration across multiple threads.

Example 5 may include a method of compiling user code, comprising identifying a nested loop iteration space in the user code, wherein the nested loop iteration space includes a plurality of outer loop iterations, distributing iterations from the nested loop iteration space across a plurality of threads, wherein each thread is assigned a group of outer loop iterations, and automatically generating a compiler output that contains serial code corresponding to each group of outer loop iterations and de-linearization code to be executed outside the plurality of outer loop iterations.

Example 6 may include the method of Example 5, wherein the de-linearization code includes index recovery code.

Example 7 may include the method of Example 6, further including positioning the index recovery code before one or more instances of the serial code in the compiler output.

Example 8 may include the method of any one of Examples 5 to 7, wherein the de-linearization code includes prologue code dedicated to an initial iteration in one or more of the groups of outer iterations.

Example 9 may include the method of Example 8, further including detecting a split of the initial iteration across multiple threads.

Example 10 may include the method of any one of Examples 5 to 7, wherein the de-linearization code includes epilogue code dedicated to a final iteration in one or more of the groups of outer iterations.

Example 11 may include the method of Example 10, further including detecting a split of the final iteration across multiple threads.

Example 12 may include at least one computer readable storage medium comprising a set of instructions which, when executed by a computing system, cause the computing system to identify a nested loop iteration space in user code, wherein the nested loop iteration space includes a plurality of outer loop iterations, distribute iterations from the nested loop iteration space across a plurality of threads, wherein each thread is to be assigned a group of outer loop iterations, and automatically generate a compiler output that contains serial code corresponding to each group of outer loop iterations and de-linearization code to be executed outside the plurality of outer loop iterations.

Example 13 may include the at least one computer readable storage medium of Example 12, wherein the de-linearization code is to include index recovery code.

Example 14 may include the at least one computer readable storage medium of Example 13, wherein the instructions, when executed, cause a computing device to position the index recovery code before one or more instances of the serial code in the compiler output.

Example 15 may include the at least one computer readable storage medium of any one of Examples 12 to 14, wherein the de-linearization code is to include prologue code dedicated to an initial iteration in one or more of the groups of outer iterations.

Example 16 may include the at least one computer readable storage medium of Example 15, wherein the instructions, when executed, cause a computing device to detect a split of the initial iteration across multiple threads.

Example 17 may include the at least one computer readable storage medium of any one of Examples 12 to 14, wherein the de-linearization code is to include epilogue code dedicated to a final iteration in one or more of the groups of outer iterations.

Example 18 may include the at least one computer readable storage medium of Example 17, wherein the instructions, when executed, cause a computing device to detect a split of the final iteration across multiple threads.

Example 19 may include a compiler of user code, comprising a nested loop detector to identify a nested loop iteration space in the user code, wherein the nested loop iteration space includes a plurality of outer loop iterations, a linearized iterations distributor to distribute iterations from the nested loop iteration space across a plurality of threads, wherein each thread is to be assigned a group of outer loop iterations, and a de-linearizer to automatically generate a compiler output that contains serial code corresponding to each group of outer loop iterations and de-linearization code to be executed outside the plurality of outer loop iterations.

Example 20 may include the compiler of Example 19, wherein the de-linearization code is to include index recovery code.

Example 21 may include the compiler of Example 20, wherein the de-linearizer includes an original index recoverer to position the index recovery code before one or more instances of the serial code in the compiler output.

Example 22 may include the compiler of any one of Examples 19 to 21, wherein the de-linearization code is to include prologue code dedicated to an initial iteration in one or more of the groups of outer iterations.

Example 23 may include the compiler of Example 22, wherein the de-linearizer includes a prologue split handler to detect a split of the initial iteration across multiple threads.

Example 24 may include the compiler of any one of Examples 19 to 21, wherein the de-linearization code is to include epilogue code dedicated to a final iteration in one or more of the groups of outer iterations.

Example 25 may include the compiler of Example 24, wherein the de-linearizer includes an epilogue split handler to detect a split of the final iteration across multiple threads.

Example 26 may include a compiler of user code, comprising means for performing the method of any of Examples 5 to 11, in any combination or sub-combination thereof.

Thus, techniques may exploit the fact that iterations of a fine-grain nested loop may be distributed across threads in groups/chunks to reduce the overhead of parallelization of nested loops. Such an approach may be particularly useful when the contiguous iterations outnumber the split iterations (e.g., in fine-grained situations having a relatively high number of iterations and/or a relatively low number of available threads).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. A code utility system, comprising:
 a processor;
 a design interface, implemented by the processor, to receive user code, wherein the user code is to embody source code written in a high level programming language;
 a compiler coupled to the design interface, the compiler including:

a nested loop detector to identify a nested loop iteration space in the user code, wherein the nested loop iteration space includes a plurality of outer loop iterations;

a linearized iterations distributor to distribute iterations from the nested loop iteration space across a plurality of threads, wherein each thread is to be assigned a group of outer loop iterations; and a de-linearizer to automatically generate a compiler output that contains serial code corresponding to each group of outer loop iterations and de-linearization code to be executed outside the plurality of outer loop iterations, wherein the de-linearization code is to include index recovery code, prologue code dedicated to an initial iteration in one or more of the groups of outer iterations, and epilogue code dedicated to a final iteration in one or more of the groups of outer iterations, and wherein the prologue code and the epilogue code are added around an original loop code, and a code traversal is adjusted to process the prologue code and the epilogue code, and wherein the de-linearizer includes an original index recoverer to position the index recovery code before one or more instances of the serial code in the compiler output; and a report interface coupled to the compiler, the report interface to transmit the compiler output.

2. The system of claim 1, wherein the de-linearizer includes a prologue split handler to detect a split of the initial iteration across multiple threads.

3. The system of claim 1, wherein the de-linearizer includes an epilogue split handler to detect a split of the final iteration across multiple threads.

4. A method comprising:
identifying a nested loop iteration space in user code, wherein the user code embodies source code written in a high level programming language and the nested loop iteration space includes a plurality of outer loop iterations;

distributing iterations from the nested loop iteration space across a plurality of threads, wherein each thread is assigned a group of outer loop iterations;

automatically generating a compiler output that contains serial code corresponding to each group of outer loop iterations and de-linearization code to be executed outside the plurality of outer loop iterations, wherein the de-linearization code includes index recovery code, prologue code and epilogue code, and the prologue code and the epilogue code are added around an original loop code, and a code traversal is adjusted to process the prologue code and the epilogue code; and positioning the index recovery code before one or more instances of the serial code in the compiler output.

5. The method of claim 4, wherein the prologue code is dedicated to an initial iteration in one or more of the groups of outer iterations.

6. The method of claim 5, further including detecting a split of the initial iteration across multiple threads.

7. The method of claim 4, wherein the epilogue code is dedicated to a final iteration in one or more of the groups of outer iterations.

8. The method of claim 7, further including detecting a split of the final iteration across multiple threads.

9. At least one non-transitory computer readable storage medium comprising a set of instructions which, when executed by a computing system, cause the computing system to:

identify a nested loop iteration space in user code, wherein the user code is to embody source code written in a high level programming language and the nested loop iteration space includes a plurality of outer loop iterations;

distribute iterations from the nested loop iteration space across a plurality of threads, wherein each thread is to be assigned a group of outer loop iterations;

automatically generate a compiler output that contains serial code corresponding to each group of outer loop iterations and de-linearization code to be executed outside the plurality of outer loop iterations, wherein the de-linearization code includes index recovery code, prologue code and epilogue code, and the prologue code and the epilogue code are added around an original loop code, and a code traversal is adjusted to process the prologue code and the epilogue code; and position the index recovery code before one or more instances of the serial code in the compiler output.

10. The at least one non-transitory computer readable storage medium of claim 9, wherein the prologue code is dedicated to an initial iteration in one or more of the groups of outer iterations.

11. The at least one non-transitory computer readable storage medium of claim 10, wherein the instructions, when executed, cause a computing device to detect a split of the initial iteration across multiple threads.

12. The at least one non-transitory computer readable storage medium of claim 9, wherein the epilogue code is dedicated to a final iteration in one or more of the groups of outer iterations.

13. The at least one non-transitory computer readable storage medium of claim 12, wherein the instructions, when executed, cause a computing device to detect a split of the final iteration across multiple threads.

14. A compiler of user code, comprising:
a processor;
a nested loop detector, implemented by the processor, to identify a nested loop iteration space in the user code, wherein the user code is to embody source code written in a high level programming language and the nested loop iteration space includes a plurality of outer loop iterations;

a linearized iterations distributor to distribute iterations from the nested loop iteration space across a plurality of threads, wherein each thread is to be assigned a group of outer loop iterations; and a de-linearizer to automatically generate a compiler output that contains serial code corresponding to each group of outer loop iterations and de-linearization code to be executed outside the plurality of outer loop iterations, wherein the de-linearization code includes index recovery code, prologue code and epilogue code, and the prologue code and the epilogue code are added around an original loop code, and a code traversal is adjusted to process the prologue code and the epilogue code, and wherein the de-linearizer includes an original index recoverer to position the index recovery code before one or more instances of the serial code in the compiler output.

15. The compiler of claim 14, wherein the prologue code is dedicated to an initial iteration in one or more of the groups of outer iterations.

16. The compiler of claim 15, wherein the de-linearizer includes a prologue split handler to detect a split of the initial iteration across multiple threads.

17. The compiler of claim 14, wherein the epilogue code is dedicated to a final iteration in one or more of the groups of outer iterations.

18. The compiler of claim 17, wherein the de-linearizer includes an epilogue split handler to detect a split of the final iteration across multiple threads.

\* \* \* \* \*